June 30, 1959 D. BROIDO 2,892,542

RECORD SORTING APPARATUS

Filed Sept. 7, 1955 4 Sheets-Sheet 1

INVENTOR
DANIEL BROIDO
BY Hane and Nydick
ATTORNEYS

INVENTOR
DANIEL BROIDO
BY Hane and Nydick
ATTORNEYS

INVENTOR
DANIEL BROIDO
BY Kane and Nydick
ATTORNEYS

INVENTOR
DANIEL BROIDO
BY Haue and Nydick
ATTORNEYS 2,892,542
Patented June 30, 1959

2,892,542

RECORD SORTING APPARATUS

Daniel Broido, Cockfosters, near Barnet, England, assignor to International Computers and Tabulators Limited, London, England Application September 7, 1955, Serial No. 532,951

Claims priority, application Great Britain September 13, 1954

12 Claims. (Cl. 209—74)

This invention relates to apparatus for sorting data-bearing documents, such as cheques, record cards, etc.

It has already been proposed to utilise a record card sorting machine in which the cards are fed along a path overlying the pockets and having a separate deflector flap for guiding cards into each pocket. A data storage mechanism is mounted adjacent to each pocket to control the opening of the deflector flap for that pocket. Each storage mechanism comprises a disc carrying a plurality of members, such as pins, which may be set to either an inoperative or an operative position.

When a column of a card is sensed, a pin is set in the storage disc of the pocket into which that card is to be delivered. The storage discs are rotated in synchronism with the feeding of the card and the operated pin engages means for opening the deflector flap just as the card reaches the selected pocket.. The time taken by the card to reach the selected pocket depends upon the distance of the pocket from the card sensing position; hence the angular distance between the means for setting the pins and the means for opening the deflector flap is different for each of the storage discs.

The object of the present invention is to provide apparatus for sorting data-bearing documents, having an improved mechanism for guiding a document into a selected pocket under control of the data recorded thereon.

According to the invention, apparatus for sorting data-bearing documents, of the type in which documents are fed in sequence through a sensing station and then along a path overlying a plurality of sequentially arranged pockets, each of which has a normally ineffective deflector for deflecting a document into the pocket, has a data storage drum carrying a plurality of groups of storage members, each member being movable parallel to the axis of the drum to either a set or a reset position, means for rotating the drum in synchronism with the document feeding means, a group of setting members, selectively operable under control of sensed data, and effective, when operated, to set each group of storage members to represent data sensed from a different document, an operating member for each deflector movable transversely to the axis of the drum by one storage member of each group, if the said member is in the set position, to operate the related deflector, and means for resetting each group of storage members prior to said group passing the setting members, the operating members being so angularly spaced about the axis of the drum, in relation to the setting members, that each deflector is operated at substantially the time that the leading edge of a document, which is to be delivered to the related pocket, reaches the deflector. The storage drum may carry a plurality of shafts which are arranged parallel to and equidistant from the axis of rotation of the drum, one group of storage members being mounted on each shaft.

The invention will now be described, by way of example, with reference to the accompanying drawings, in which.

The invention will be described in connection with a machine for sorting cheques on which data is recorded by a combinational code in which each digit is represented by holes punched in two out of six possible positions.

The cheques are fed one by one from a stack on to the bed of the sorter and are aligned by reference to one edge. A pair of conveyor belts carry the cheques past a sensing position and along the sorter over a series of ten pockets, the top of the pocket being normally covered by a deflector flap. As each cheque passes the sensing station, a chosen column of holes is sensed to determine into which pocket the cheque should be fed.

As the pockets are situated in succession along the path of travel of the cheque the sensed data has to be stored until the cheque is approaching the selected pocket and it must then control the opening of the deflector flap of this pocket. This data storage function is provided by a drum consisting of a number of shafts mounted between two circular plates.

Each shaft carries ten rollers, each of which is capable of being set in one or other of two positions along the shaft. As a cheque is sensed, a roller corresponding to the pocket required is moved transversely along the shaft to an operative position. The storage drum rotates in synchronism with the movement of the cheque along the sorter, and a member for operating the deflector flap is so positioned that it will be operated by this roller when the cheque is approaching the selected pocket.

The separation between cheques as they are fed along the sorter is such that eight cheques occupy approximately the same length as that occupied by the ten pockets. Accordingly, provision is made for storing data from eight cheques; that is, the storage drum has eight shafts, each carrying ten rollers. The shafts are so positioned on the drum that, as each cheque is sensed, a group of ten rollers are aligned with the roller setting mechanism.

The code used for recording data on the cheques is set out below, the six possible code positions being indicated by the letters A to F.

| Digit | 1 | 2 | 3 | 4 | 5 | 6 | 7 | 8 | 9 | 0 |
|---|---|---|---|---|---|---|---|---|---|---|
| Code Positions | AE | BE | AB | CE | AC | BC | CF | DE | AD | EF |

Figure 7:
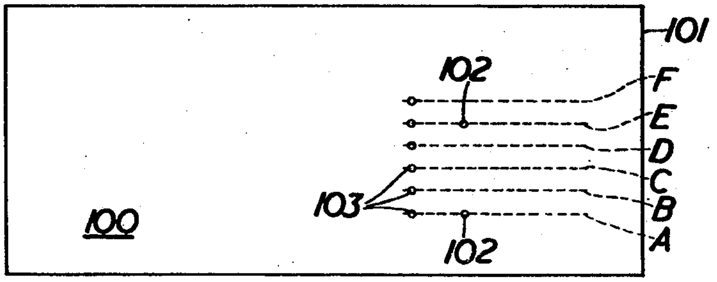
Figure 7 illustrates a cheque to be sensed.

A cheque 100 is illustrated in Figure 7 by way of example. Each digit of the data, such as an account number, is recorded in a separate column, the columns being parallel to and accurately positioned with respect to one of the shorter edges 101 of the cheque. The data is recorded in each column by two small holes 102 punched in any of six columnar positions A to F. In the example shown, the holes 102 are punched in the A and E positions representing the number 1. The cheque has also six timing holes 103 which are used to generate pulses correctly to control the timed operation of the sensing mechanism to be described later.

The cheques are fed one at a time from a stack, by a suction type feeding mechanism (not shown). This feeding mechanism is preferably similar to the first embodiment shown and described in British patent specification No. 729,892.

As each cheque is fed from the stack it is aligned with respect to the reference edge by an aligning fence (not shown). The cheque is delivered on to a plate 2 (Figure 2), with the shorter edges parallel to side plates 6 of the sorter.

Figure 1:
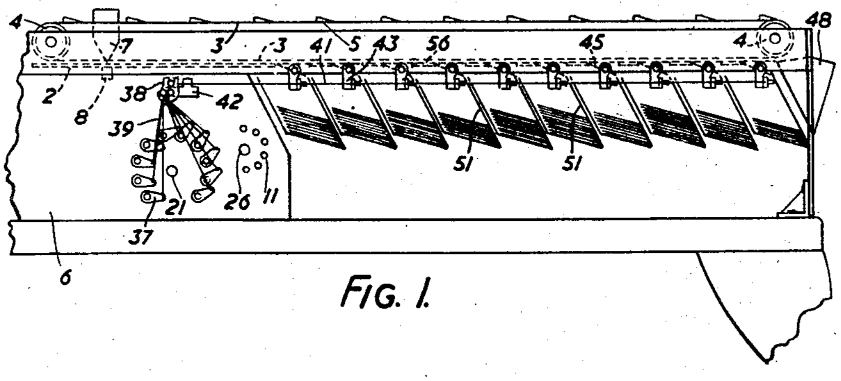
Figure 1 is a partial side elevation of a sorter.

A pair of flexible belts 3 (Figures 1 and 2) are supported by pairs of rollers 4, one roller of each pair being secured to a shaft which is continuously driven from a shaft 12, through a chain 50. Each of the belts 3 carries a number of pushers 5, which project from the surface of the belt. As the belts move a pair of pushers 5 engage the rear edges of a cheque lying on the plate 2 and carry it along the sorter from left to right. The plate 2 is recessed near the edges adjacent to the side plates 6 to accommodate the pushers 5.

The distance between adjacent pushers 5 on the same belt is rather greater than the length of the shorter edge of the cheque. The feeding mechanism for delivering cheques to the plate 2 is driven by a motor (not shown) which also drives the shaft 12, so that cheques are delivered on to the plate at the correct timing to allow each pair of pushers to engage and feed a single cheque.

As a cheque moves from left to right over the plate 2, it passes beneath a photo-electric sensing head 7, which, in conjunction with a light source 8, senses the data recorded in a chosen column of the cheque and the timing holes 103. Having been sensed, the cheque is carried over a series of deflector flaps 45, which normally cover the entrance to sorter pockets 51. The sensed data controls the opening of one of the deflector flaps, so that the cheque drops away from the belts 3 into the appropriate sorter pocket.

Figure 8:
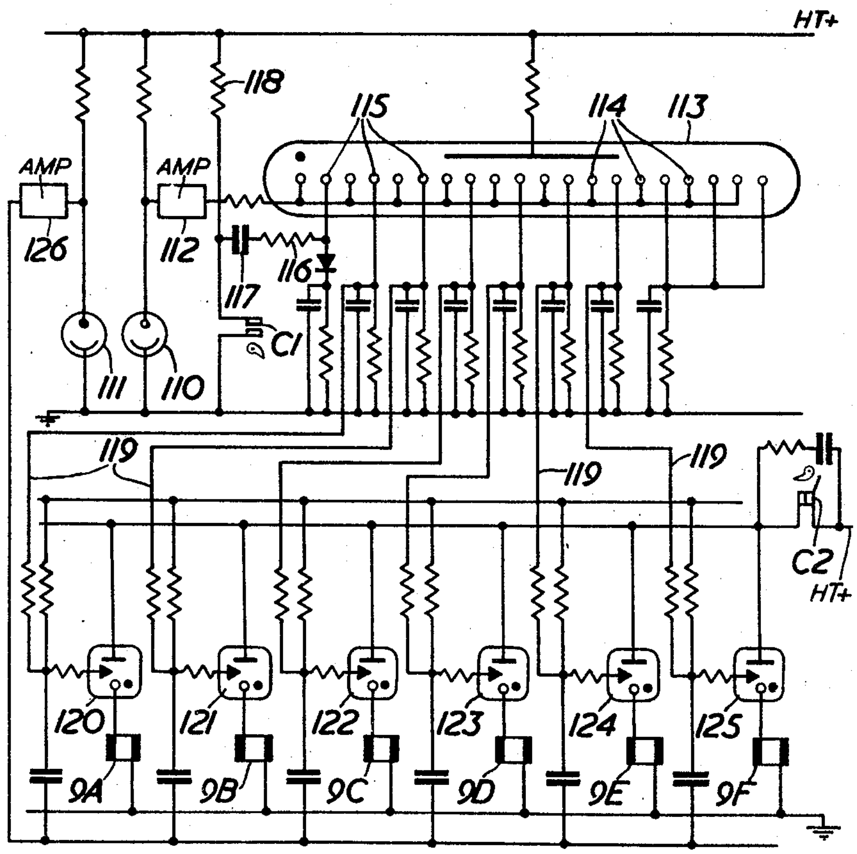
Figure 8 is a circuit diagram of the sensing mechanism.

The sensing mechanism may be of any convenient form but by way of example one form is shown in Figure 8. As there shown, there are two photocells which are located in the sensing head 7, one photocell 110 for the timing holes 103 and the other photocell 111 for the data-representing holes 102. Photocell 110 produces a pulse each time a timing hole passes beneath it and the pulses are applied via an amplifier 112 which amplifies and shapes the pulses to a counter shown as a multi-cathode gas valve 113.

The method of operation of the multi-cathode valve 113 is well known and it suffices to say that the application of pulses to a triggering electrode guide 114 causes the discharge to step successively along the cathodes 115. A valve having ten cathodes is illustrated as this type is commercially available although in this instance the valve has to count to six only.

The extreme left hand cathode 115 of valve 113 is connected to the HT+ line through a resistor 116, a condenser 117 and resistor 118. It may also be connected through cam controlled contacts C1 to earth. Contacts C1 close after each cheque has been sensed and on closure the potential of the cathode drops sufficiently to ensure that the discharge is brought back to that cathode and thereby to reset the valve 113.

The next six cathodes of valve 113 are connected through lines 119 to the respective grids of six gas filled triodes 120, 121, 122, 123, 124 and 125. Each of these triodes has in its cathode circuit an electromagnet 9A—9F. The grids of triodes 120—125 are also connected to the data-sensing photocell 111 through an amplifier 126 which also shapes pulses applied thereto.

Each time one of the timing holes 103 is sensed the discharge is stepped along one cathode of valve 113. Thus, on the sensing of the first of the timing holes, the discharge will be on the second cathode 115 and the grid of triode 120 will be brought to a priming potential. If at the same time, a data hole 102 is sensed, a pulse will be received on the grids of all the gas triodes, but as only triode 120 has been primed, only that triode will conduct and cause energisation of magnet 9A.

Valves 120—125 are primed in turn and will be rendered conducting when there is a data hole 102 sensed at the same time. In the case shown in Figure 7, after sensing of the cheque, the valves 120 and 124 will be rendered conducting and the magnets 9A and 9E will be energised. Cam operated contacts C2 are provided in the anode circuit of triodes 120—125 to cause extinction thereof at the end of the cycle.

Figures 2, 5:
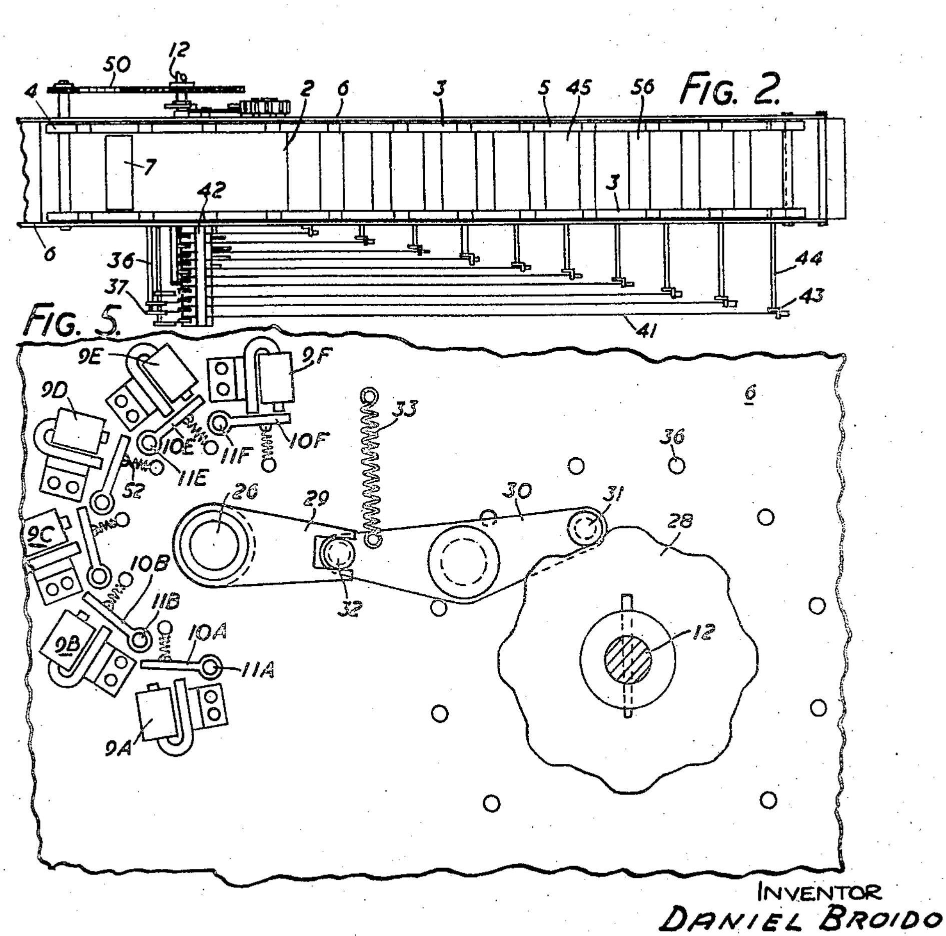
Figure 2 is a corresponding plan view of the sorter.
Figure 5 is a side elevation of a cam rocking arm and pawl selector magnets.

The magnets 9 are also shown in Figure 5, the letter suffixes thereof and of the parts associated therewith indicating the code position to which they relate.

The magnets 9 are mounted on the outside of one of the plates 6. Each magnet has an armature 10 which is secured to one end of a shaft 11. The six shafts 11 are journalled in bearings in the two plates 6.

Figure 3:
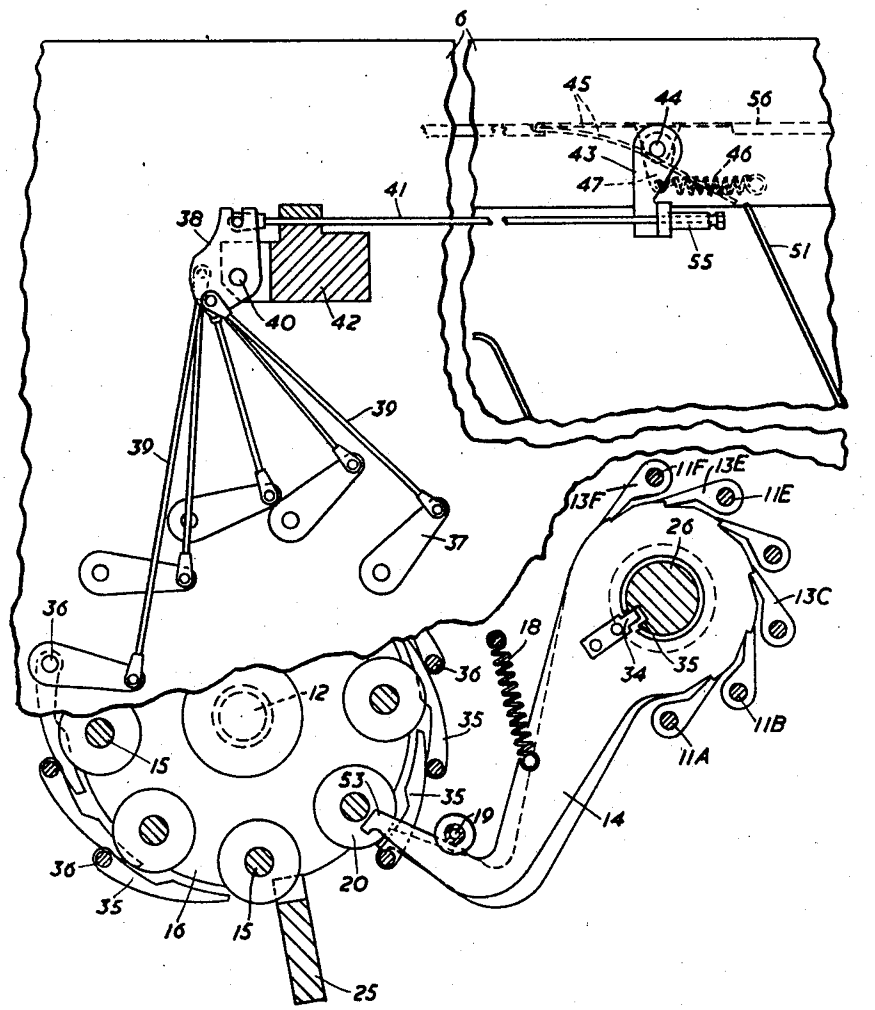
Figure 3 is a side elevation of a pocket operating mechanism with part removed to show a roller setting arm.
Figure 4:
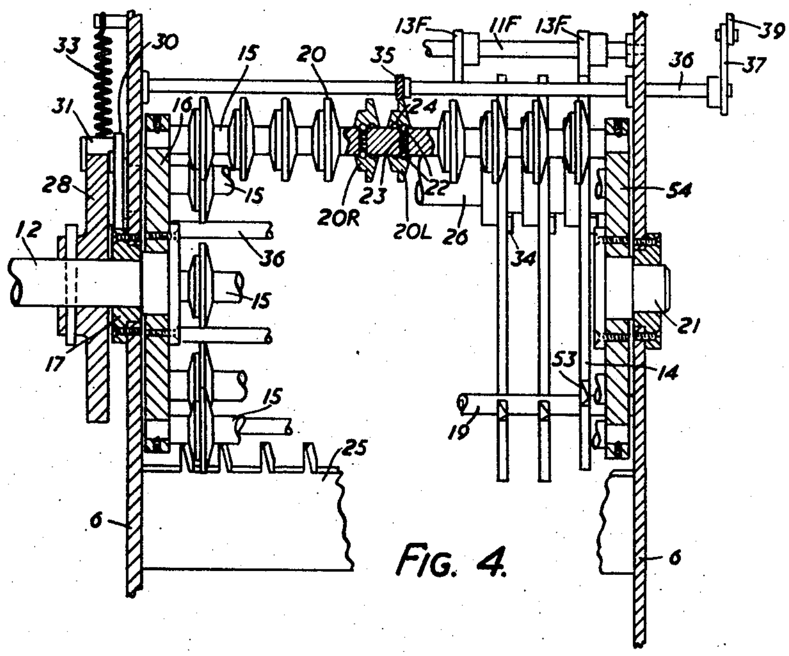
Figure 4 is a section showing the selection mechanism with certain parts omitted.
Figure 6:
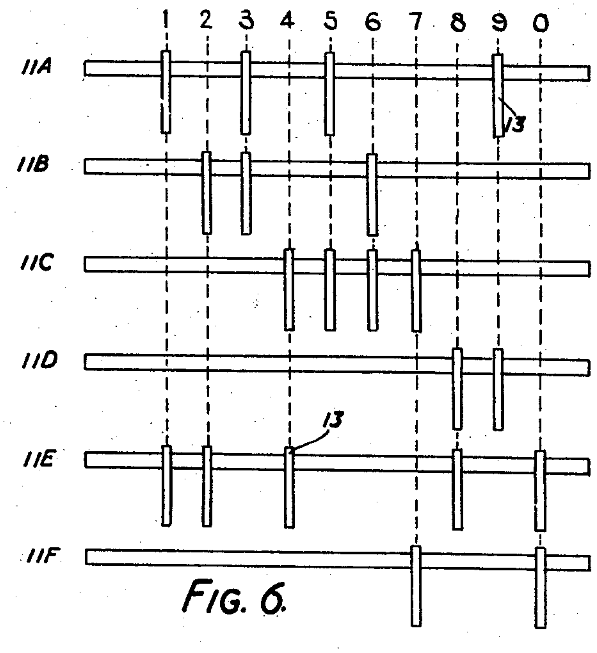
Figure 6 is a diagram showing the position of the selection pawls in relation to the roller setting arms.

Each shaft 11 has secured to it two or more latch pawls 13 (Figures 3, 4 and 6). These pawls engage notches in selector arms 14. There are ten arms 14, one for each of the pockets. Each arm is provided with six notches, but only two notches are engaged by the latch pawls 13. The pawls are normally held in the notches by the action of armature springs 52.

The arrangement of pawls and notches on the selector arms serves to translate the two-out-of-six coding into a selection of one-out-of-ten conditions. For example, if the digit five is recorded in the column being sensed, then the magnets 9A and 9C will be energised. The movement of the armatures of these magnets will rock the shafts 11A and 11C. This will lift the pawls from the selector arms for the pockets corresponding to the digits 1, 3, 5 and 9 (Figure 6) for the shaft 11A and digits 4, 5, 6 and 7 for the shaft 11C. The selector arm for the digit 5 is the only one for which both pawls are lifted and hence it is the only one which is released. The arms for the digits 1 and 4 are still held by the unoperated pawls on the shaft 11E. The arms for the digits 3 and 6 are held by the pawls on the shaft 11B. The arms for the digits 7 and 9 are held by the pawls on the shafts 11F and 11D respectively. In a similar way, the operation of any pair of the six magnets 9 in accordance with the code will release one, and only one, of the ten selector arms 14.

The selector arms 14 are mounted on a shaft 26. A tongue 34, which is secured to each arm, projects into an axial slot 35 cut in the shaft 26. The tongues 34 are held against one side of the slot by springs 18, the selector arms then being in such a position that the pawls 13 are just not touching the radial faces of the notches. Thus, the magnets 9 do not have to overcome friction between the pawls and the selector arms.

An arm 29 (Figure 5) is secured to the shaft 26. A slot in the end of the arm 29 engages a roller 32 which is mounted on one end of a lever 30. A roller 31 on the other end of the lever 30 is held in contact with a cam 28 by a spring 33. The cam 28 is pinned to the shaft 12.

The cam and linkage rocks the shaft 26 in a clockwise direction, as viewed in Figure 3, just after the magnets 9 have been energised as the result of sensing a cheque.

A selector arm which has been released by the latch pawls will follow the movement of the shaft 26, through friction between it and the shaft and the pull of the spring 18. Each arm 14 is guided by a roller 19 (Figure 3). The remaining selector arms make only a very slight movement before they are arrested by the latch pawls. The slot 35 in the shaft 26 is sufficiently wide to allow the shaft to move the required amount without the side of the slot engaging the tongues of the arms which are not operated.

Each selector arm has a nose 53, which is tapered to form a cam face. When the arm is operated, this nose lies in the path of travel of the associated storage rollers 20.

A circular plate 16 (Figure 4) is secured to the end of the shaft 12 which projects into the space between the side plates 6. A similar plate 54 is secured to a stud shaft 21. The plates 16 and 54 are joined together by eight shafts 15 which are spaced at equal angular distances. Each of the shafts 15 carries ten of the storage rollers 20.

A diametral hole is drilled through the shafts 15 at the position allocated to each storage roller 20. Each hole contains a small spring 23 which maintains two steel balls 22 in contact with the inner surface of the roller. The roller has two circumferential grooves 24 on the inner surface, so that the roller has two stable positions, with the balls 22 seated in one groove or the other. The two positions are illustrated by the rollers 20L and 20R (Figure 4).

As the shaft 12 rotates anti-clockwise (Figure 3) each group of ten rollers 20 passes a resetting comb 25. The teeth of the comb are tapered to form a cam surface which engages the rollers to move them all to the reset position, corresponding to that of the roller 20R.

After they have been reset, the rollers pass in front of the noses 53 of the selector arms 14. If a selector arm has been released and has moved into operative position, the nose 53 will engage the side of the corresponding roller as it passes, and shift it to the set position, to occupy the same relative position as the roller 20L.

It has been explained that the selector arm which is operated corresponds to the digit sensed from the cheque. This data is now transferred to the storage drum formed by the eight groups of ten rollers each by the shifting of one roller of a group of ten to the set position.

Since an indication of the sensed digit is now held by the storage drum, the released selector arm may be reset. This is done by the cam 28, which turns the shaft 26 so that the arm 14 is moved anti-clockwise. At the same time, the cam operated contact C2 momentarily opens to break the anode circuit of the gas valves which control energisation of the magnets 9. This allows the pawls 13 to fall back into the notches in the selector arms.

The pockets 51 correspond to the digits 1 to 9 and 0 in order, starting at the pocket adjacent to the sensing head 7. The indication of a sensed digit has to be stored for a time equal to that taken by a cheque to reach the selected pocket, after it has been sensed. The longest time is taken by a cheque which is to be sorted into the "0" pocket. The separation between successive cheques is such that seven more cheques will be sensed before such a cheque reaches the pocket. Thus, it is necessary to provide for the storage of a maximum eight digits, which is effected by the eight groups of rollers 20.

In order to provide the different time delays between sensing a digit and operating a pocket deflector, ten cam follower arms 35 (Figures 3 and 4) are spaced around the circumference of a circle having the same centre as the storage drum. The arm 35 which is shown adjacent to the selector arms 14 in Figure 3 controls the deflector for the "1" pocket. The next arm 35, in an anti-clockwise direction, controls the "2" pocket, and so on in order.

Each arm 35 is secured to a shaft 36. The shafts 36 are connected to bell cranks 38, through links 37 and 39. The cranks 38 are freely pivoted on a common spindle 40 which is mounted on one of the side plates 6. The other arm of each crank is slotted to take one end of a pull rod 41, which is free to slide in a guide 42. The other end of each rod 41 passes through a hole in an arm 43. The effective length of the rod 41 may be set by the adjusting nut 55.

The arm 43 is fixed to a spindle 44, which also carries the pocket deflector 45 and an arm 47. A spring 46, acting on the arm 47, tends to keep the deflector closed. The deflector is approximately V-shaped, with the vertex facing the sensing station. One leg of the V covers the pocket opening when the deflector is closed and the other leg guides the cheque into the pocket when the deflector is opened. Members 56 (Figures 1, 2 and 3), which are mounted on the side plates 6, provide additional support for the cheque to ensure correct feeding by the belts 3.

When a roller 20 is in the set position, it will rock the related cam follower arm 35 as it passes beneath it, as shown for the roller 20L (Figure 4). This will rotate the shaft 36 and thus, through the linkage described, will shift the rod 41 to open the associated deflector 45. The rollers 20 are free to rotate on the shafts 15 and in consequence they provide a smooth camming action. At the same time, the arms 35 exert no lateral thrust tending to force the rollers out of the set position. When a roller is in the reset position, it is out of alignment with the related arm 35. If a cheque is not correctly sensed, then the code combination is not transferred to the gas valves 120—125 which control the magnets 9. In this case none of the selector arms 14 will be released, none of the deflectors will be operated, and the cheque will be carried past the last pocket to fall into a reject hopper 48.

What I claim is:

1. Apparatus for sorting data bearing documents comprising a sensing station; a plurality of sequentially arranged pockets; means for feeding documents in sequence through said sensing station and then past said pockets; a normally ineffective deflector for each said pocket, said deflector when operated deflecting a document into said pocket; a storage drum driven in synchronism with said feed means, said drum including a plurality of shafts arranged parallel to and equidistant from the axis of rotation of said drum; for each of said pockets, a storage member on each of said shafts, movable along its shaft between an operative position and an inoperative position, all storage members for said pocket being located at substantially the same axial positions on said shafts, a setting member located at the periphery of said drum, and movable into a setting position in the path of the storage members for the pocket, said setting member when in said setting position operating to said operative position the first storage member to be carried by the drum therepast, and an operating member located at the periphery of the drum and coupled to the deflector of the pocket, said operating member being actuated by a storage member in operative position to operate said deflector; means controlled by said sensing station for operating to said setting position a selected one of said setting members; and means for resetting to inoperative position said storage members prior to passing said setting members, each said operating member being displaced from the setting member for the same pocket in proportion to the distance of that pocket from the sensing station.

2. Apparatus for sorting data bearing documents comprising a sensing station; a plurality of sequentially arranged pockets; means for feeding documents in sequence through said sensing station and then past said pockets; a normally ineffective deflector for each said pocket, said deflector when operated deflecting a document into said pocket; a storage drum driven in synchronism with said feed means, said drum including a plurality of shafts arranged parallel to and equidistant from the axis of rotation of said drum; for each of said pockets, a storage member on each of said shafts, movable along its shaft between an operative position and an inoperative position, a spring loaded detent device within each shaft co-operating with a pair of recesses in the storage member on that shaft for holding the storage member impositively in either said operative position or said inoperative position, all storage members for said pocket being located at substantially the same axial position on said shafts, a setting member located at the periphery of said drum and movable into a setting position in the path of the storage members for the pocket, said setting member when in said setting position operating to said operative position the first storage member to be carried by the drum therepast, and an operating member located at the periphery of the drum and coupled to the deflector of the pocket, said operating member being actuated by a storage member in operative position to operate said deflector; means controlled by said sensing station for operating to said setting position a selected one of said setting members; and means for resetting to inoperative position said storage members prior to passing said setting members, each said operating member being displaced from the setting member for the same pocket in proportion to the distance of that pocket from the sensing station.

3. Apparatus for sorting data bearing documents comprising a sensing station; a plurality of sequentially arranged pockets; means for feeding documents in sequence through said sensing station and then past said pockets; a normally ineffective deflector for each said pocket, said deflector when operated deflecting a document into said pocket; a storage drum driven in synchronism with said feed means, said drum including a plurality of shafts arranged parallel to and equidistant from the axis of rotation of said drum; for each of said pockets, a storage member on each of said shafts, movable along its shaft between an operative position and an inoperative position, all said storage members for said pocket being located at substantially the same axial position on all said shafts, each said storage member being disc-like and having on opposite faces a first cam surface and a second cam surface and also having a peripheral third cam surface, a setting member located at the periphery of said drum and movable into a setting position in the path of the storage members for the pocket, said setting member when in said setting position engaging said first cam surface of the first storage member to be carried therepast and there camming that storage member from said inoperative position to said operative position, and an operating member located at the periphery of said drum and coupled to the deflector of the pocket, said operating member being engaged by said third cam surface of a storage member in operative position and actuated thereby to operate said deflector, said operating member being displaced from said setting member in proportion to the distance of said pocket from said sensing station; means controlled by said sensing station for operating to said operative position a selected one of said setting members; and means engageable with said second cam surface for resetting to inoperative position said storage members prior to passing said setting members.

4. Apparatus for sorting documents according to data carried thereon, comprising a sensing station for sensing said data; a plurality of sequentially arranged pockets; means for feeding documents in sequence through said sensing station and then past said pockets in sequence; a normally ineffective deflector for each said pocket, said deflector when operated deflecting a document into said pocket; a rotary member driven in synchronism with said feeding means about an axis of rotation; a plurality of shafts carried by said rotary member parallel to and equidistant from said axis of rotation; on each one of said shafts, a group of disc-like storage members having on opposite faces a first cam surface and a second cam surface and also having a peripheral third cam surface, each said group including an individual storage member for each one of said pockets and the storage members for each of said pockets being located on all said shafts at substantially the same axial position along said shafts; a spring loaded detent for each said storage member on each shaft mounted in the shaft and co-operating with a first and a second recess in that storage member to hold that storage member in an operative position and an inoperative position respectively; for each one of said pockets, a setting member disposed adjacent the path of the storage members for that same pocket and movable into a setting position, said setting member when in setting position engaging said first cam surface of the first of those storage members to be carried therepast and camming that storage member from said inoperative position to said operative position; for each one of said pockets, an operating member coupled to the deflector of that pocket and located adjacent the path of said storage members of the same pocket, said operating member being engaged by said third cam surface of a storage member in operative position and actuated thereby to operate said deflector; means controlled by said sensing station for operating for each document sensed one of said setting members according to the data on said document; and means engageable with said second cam surface for resetting to inoperative position any storage device in operative position of each said group prior to that group passing said setting members.

5. Apparatus for sorting documents according to data carried thereon, comprising a sensing station for sensing said data; a plurality of sequentially arranged pockets; means for feeding documents in sequence through said sensing station and then past said pockets in sequence; a normally ineffective deflector for each said pocket, said deflector when operated deflecting a document into said pocket; a rotary member driven in synchronism with said feeding means about an axis of rotation; a plurality of shafts carried by said rotary member parallel to and equidistant from said axis of rotation; on each one of said shafts, a group of disc-like storage members having on opposite faces a first cam surface and a second cam surface and also having a peripheral third cam surface, each said group including an individual storage member for each one of said pockets and the storage members for each of said pockets being located on all said shafts at substantially the same axial position along said shafts; for each said storage member on each said shaft, a steel ball located at each end of a diametrical hole in said shaft, a compression spring within said hole and between said balls, said spring forcing said balls into one of a pair of axially spaced grooves in the storage member to hold that storage member in either an operative position or an inoperative position on said shaft, each storage member being rotatable on its shaft and slidable axially along its shaft between said operative and inoperative positions for each one of said pockets, a setting member disposed adjacent the path of the storage members for that same pocket and movable into a setting position, said setting member when in setting position engaging said first cam surface of the first of those storage members to be carried therepast and camming that storage member from said inoperative position to said operative position; for each one of said pockets, an operating member coupled to the deflector of that pocket and located adjacent the path of said storage members of the same pocket, said operating member being engaged by said third cam surface of a storage member in operative position and actuated thereby to operate said deflector; means controlled by said sensing station for operating for each document sensed one of said setting members according to the data on said document; and means engageable with said second cam surface for resetting to inoperative position any storage device in operative position of each said group prior to that group passing said setting members.

6. Apparatus for sorting documents according to a number of different characteristics according to data recorded on said documents in a combinational code employing fewer code positions than the number of characteristics, which apparatus comprises a plurality of sequentially arranged pockets, one for each said characteristic; a sensing station for sensing said data from said documents; means for feeding documents in sequence through said sensing station and then past said pockets; a normally ineffective deflector for each said pocket, said deflector when operated deflecting a document into said pocket; a storage drum driven in synchronism with said feed means, said drum including a plurality of shafts arranged parallel to and equidistant from the axis of rotation of said drum; for each of said pockets, a storage member on each of said shafts, movable along its shaft between an operative position and an inoperative position, all storage members for said pocket being located at substantially the same axial positions on said shafts, a setting member located at the periphery of said drum and movable into a setting position in the path of the storage members for the pocket, said setting member when in said setting position operating to said operative position the first storage member to be carried by the drum therepast, and an operating member located at the periphery of the drum and coupled to the deflector of the pocket, said operating member being actuated by a storage member in operative position to operate said deflector, each said operating member being displaced from said setting member in proportion to the distance of that pocket from the sensing station; an electromagnet for each said code position; means for energising said electro-magnet by said sensing station selectively according to the data on a document; means controlled by said energised electro-magnets for operating to said setting position a selected one of said setting members; and means for resetting to inoperative position said storage members prior to passing said setting members.

7. Apparatus as claimed in claim 6 in which said means for operating said setting members comprises a plurality of latch pawls engaging said setting means normally for preventing movement thereof to setting position, said latch pawls being operated by said electro-magnets selectively to permit movement of a selected one of said setting members, and means, common to all said setting members and operated in synchronism with said storage drum, for moving to setting position said selected one of said setting members.

8. Apparatus as claimed in claim 7, having a common shaft on which said setting members are mounted, a longitudinal groove in said common shaft, a tongue on each said setting member engaging in said groove, a spring biasing each setting member towards said operative position, and means for rocking said common shaft to allow a released setting member to move to said operative position.

9. Apparatus as claimed in claim 8, in which the normal position of said common shaft is such that one wall of the longitudinal groove engages the tongues, so that the force of the biasing springs is exerted on said common shaft and not on the latch pawls.

10. Apparatus as claimed in claim 7, in which each setting member is controlled by two latch pawls, which are operated by different electro-magnets.

11. Apparatus for sorting documents according to a number of different characteristics according to data recorded on said documents in a combinational code employing fewer code positions than the number of characteristics, which apparatus comprises a plurality of sequentially arranged pockets, one for each said characteristic; a sensing station for sensing data from said documents; means for feeding documents in sequence through said sensing station and then past said pockets in sequence; a normally ineffective deflector for each pocket, said deflector when operated deflecting a document into said pocket; a rotary member driven in synchronism with said feeding means about an axis of rotation; a plurality of shafts carried by said rotary member parallel to and equidistant from said axis of rotation; on each one of said shafts a group of disc-like storage members having on opposite faces a first cam surface and a second cam surface and having also a peripheral third cam surface, said storage member being movable along said shafts, each said group including a storage member individual to each one of said pockets and the storage members for each of said pockets being located on all said shafts at substantially the same axial positions along said shafts; indexing means for retaining each said storage member impositively in either of an operative position and an inoperative position spaced apart along its shaft; a group of setting members arranged parallel to said axis of rotation including a setting member for each one of said pockets disposed adjacent the path of the storage members for that pocket and movable into a setting position, said setting member when in setting position engaging said first cam surface of the first of the storage members to be carried therepast and camming that storage member from said inoperative position to said operative position; an operating member for each of said pockets coupled to the deflector of that pocket and located adjacent the path of said storage members of the same pocket, said operating member being engaged by said third cam surface of a storage member in operative position and actuated thereby to operate said deflector, said operating members being spaced round said rotary member according to the distances of said pockets from said sensing station; an electromagnet for each said code position; means operated by said sensing station for energising said electro-magnets selectively according to the data on a document; means controlled by said energised electro-magnets for operating to said setting position a selected one of said setting members and thereby moving to operative position a selected one of the setting members of one of said group; and means engageable with said second cam surface for resetting to inoperative position the storage members of each said group prior to that group passing said setting members.

12. In an apparatus for sorting data bearing documents, a rotary member, a plurality of shafts carried by said rotary member parallel to and equidistant from the axis of rotation thereof, a group of disc-like storage members on each of said shafts, rigid balls for each of said storage members on each of said shafts, one of said balls being located at each end of a diametrical hole in the respective shaft, and a compression spring within each of said holes and between the respective balls at the ends thereof, said springs forcing the respective balls into one of a pair of axially spaced grooves in the respective storage member to hold that storage member in either an operative position or an inoperative position on the respective shaft, each of said storage members being rotatable on its shaft and slidable axially along its shaft between said operative and inoperative positions.

References Cited in the file of this patent

UNITED STATES PATENTS

| | | |
|---|---|---|
| 1,626,359 | Rundell | Apr. 26, 1927 |
| 2,454,628 | Braun | Nov. 23, 1948 |